United States Patent
Hsu

[11] Patent Number: 5,747,185
[45] Date of Patent: May 5, 1998

[54] HIGH TEMPERATURE ELECTROCHEMICAL CONVERTER FOR HYDROCARBON FUELS

[75] Inventor: Michael S. Hsu, Lincoln, Mass.

[73] Assignee: Ztek Corporation, Waltham, Mass.

[21] Appl. No.: 557,952

[22] Filed: Nov. 14, 1995

[51] Int. Cl.[6] .................................................. H01M 8/02
[52] U.S. Cl. .............................. 429/44; 424/33; 424/30
[58] Field of Search ..................... 429/40, 44, 30, 429/32, 34, 41, 31

[56] References Cited

U.S. PATENT DOCUMENTS

| | | | |
|---|---|---|---|
| 4,456,664 | 6/1984 | Crosbie et al. | 429/104 |
| 4,562,124 | 12/1985 | Ruka | 429/30 |
| 4,631,238 | 12/1986 | Ruka | 429/30 |
| 4,702,971 | 10/1987 | Isenberg | 429/31 |
| 4,721,556 | 1/1988 | Hsu | 204/258 |
| 4,812,329 | 3/1989 | Isenberg | 427/115 |
| 4,828,613 | 5/1989 | Hoshino et al. | 75/251 |
| 4,950,562 | 8/1990 | Yoshida et al. | 429/32 |
| 4,971,830 | 11/1990 | Jensen | 427/34 |
| 5,302,470 | 4/1994 | Okada et al. | 429/17 |
| 5,332,598 | 7/1994 | Kawasaki et al. | 427/453 |
| 5,342,706 | 8/1994 | Marianowski et al. | 429/35 |
| 5,348,776 | 9/1994 | Ippommatsu et al. | 427/586 |
| 5,368,951 | 11/1994 | Shiratori et al. | 429/30 |
| 5,389,456 | 2/1995 | Singh et al. | 429/27 |
| 5,426,002 | 6/1995 | Matsumura et al. | 429/20 |
| 5,432,024 | 7/1995 | Soma et al. | 429/44 |
| 5,458,857 | 10/1995 | Collins et al. | 422/198 |
| 5,480,739 | 1/1996 | Kawasaki et al. | 429/33 |

FOREIGN PATENT DOCUMENTS 0562411  9/1993  European Pat. Off. .

OTHER PUBLICATIONS

Appleby, A.J. et al., "fuel Cell Handbook," Krieger Publishing Company, 584(1993).

Primary Examiner—M. Nuzzolillo
Attorney, Agent, or Firm—Thomas J. Engellenner; Anthony A. Laurentano; Lahive & Cockfield, LLP

[57] ABSTRACT

A sulfur-tolerant electrochemical converter having low internal resistance that is capable of directly processing hydrocarbon fuel having a sulfur component of up to about 50 ppm, and in excess of this amount, without suffering permanent structural damage or suffering a significant and/or permanent decrease in overall operating performance. The electrochemical converter is a high temperature fuel cell that has an operating temperature between about 600° C. and about 1200° C. and is capable of internally vaporizing and/or reforming the hydrocarbon fuel. One or more of the converter constituents, such as the interconnector, the contact surfaces of the interconnector, the fuel electrode, and the oxidizer electrode, is composed of a selected mixture containing chromium oxide and an alkaline metal oxide.

57 Claims, 3 Drawing Sheets

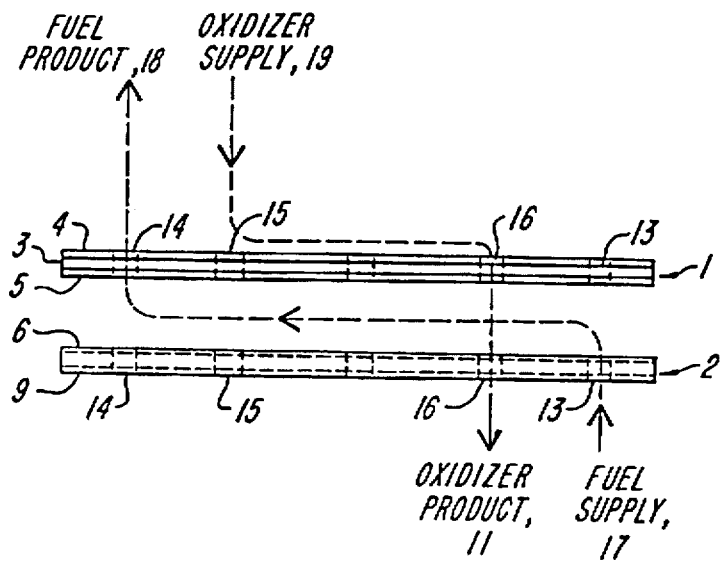
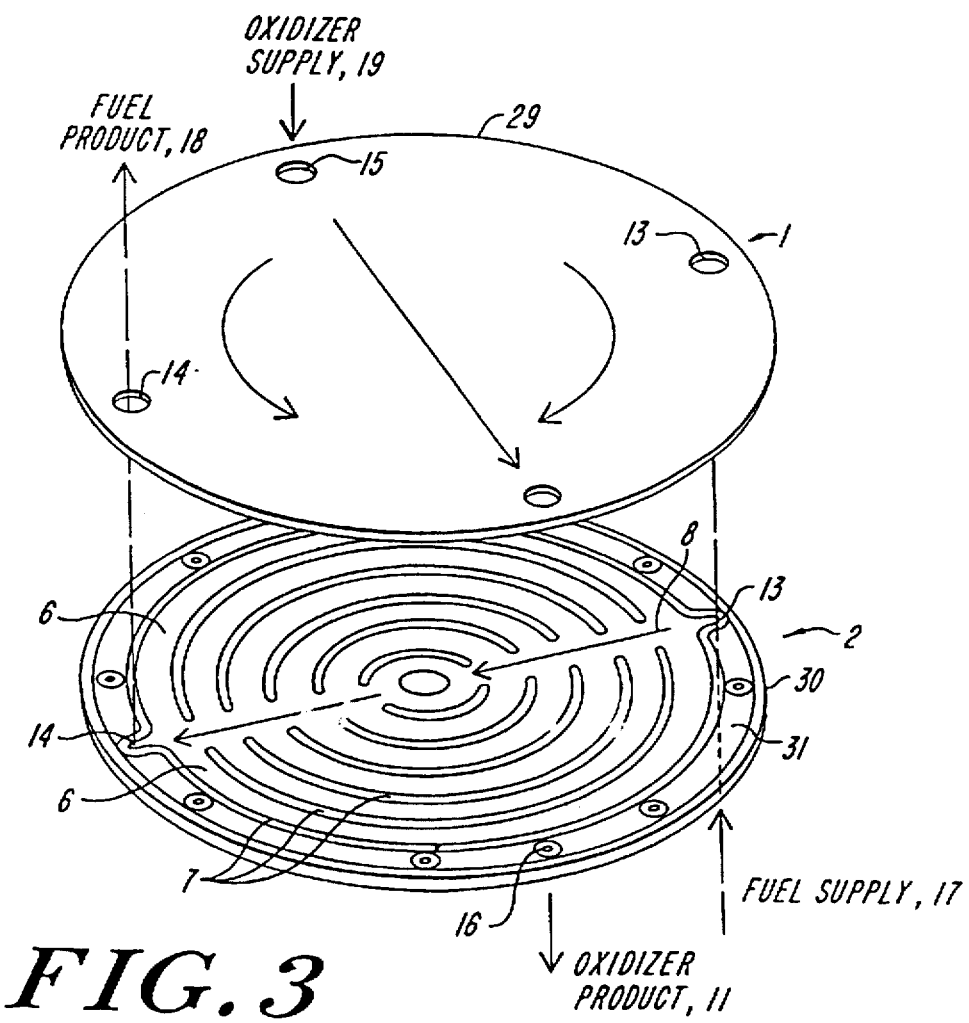

FUEL ELECTRODE CONTRIBUTION TO FUEL CELL RESISTANCE

|  | MCFC | TUBULAR SOFC | ZTEK PLANAR SOFC |
|---|---|---|---|
| ELECTRODE THICKNESS (mm) | 1.00 | 0.15 | 0.15 |
| ELECTRODE PATH LENGTH (mm) | 5.00 | 7.85 | 1.25 |
| ELECTRODE AREA (mm x mm) | 10.00 | 15.70 | 2.50 |
| RESISTANCE X CURRENT GEOMETRIC FACTOR | 50 | 822 | 21 |
| VOLTAGE LOSS RATIO | 2.4 | 39 | 1 |

*FIG. 4*

HIGH TEMPERATURE ELECTROCHEMICAL CONVERTER FOR HYDROCARBON FUELS

BACKGROUND OF THE INVENTION

This invention relates to high temperature electrochemical converters, and specifically to electrochemical converters that process hydrocarbon fuels.

Electrochemical converters, such as fuel cells, have been known as systems for converting chemical energy derived from fuel stocks directly into electrical energy. A typical fuel cell consists mainly of a series of electrolyte units, onto which fuel and oxidizer electrodes are attached, and a similar series of interconnectors disposed between the electrolyte units to provide serial electrical connections. Electricity is generated between the electrodes and within the electrolyte by an electrochemical reaction that is triggered when a fuel, e.g., hydrogen, is introduced across the fuel electrode and an oxidant, e.g., air, is introduced across the oxidizer electrode.

Typically, each electrolyte unit is an ionic conductor having low ionic resistance thereby allowing the transport of an ionic species from one electrode-electrolyte interface to the opposite electrode-electrolyte interface under the operating conditions of the converter. The electrical current can be removed from the converter for subsequent use by electrically tapping the interconnector plates.

One type of fuel cell typically employed in fuel cell power generation systems is a solid oxide fuel cell. The conventional solid oxide fuel cell also includes, in addition to the features listed above, an electrolyte having a porous fuel and oxidizer electrode material applied on opposing sides of the electrolyte. The electrolyte is typically an oxygen ion conducting material, such as stabilized zirconia. The oxidizer electrode, which is typically maintained in an oxidizing atmosphere, is usually an oxide doped for high electrical conductivity, such as strontium doped lanthanum manganite ($LaMnO_3(Sr)$). The fuel electrode is typically maintained in a fuel rich or reducing atmosphere and is usually a cermet such as zirconia-nickel ($ZrO_2/Ni$). The interconnector plate of the solid oxide fuel cell typically is made of an electronically conducting metal material which is stable in both an oxidizing and reducing atmosphere.

Utilization of hydrocarbon fuels as fuel for a fuel cell is well known in the art. These conventional hydrocarbon fuels contain levels of sulfur and other contaminants that exceed desired operating levels. Thus, the hydrocarbon fuel is typically pre-processed and reformed prior to introduction to the power generation equipment to remove harmful components, such as sulfur. Specifically, it is known that sulfur present in hydrocarbon fuel poisons the nickel catalyst of the fuel electrode present in the fuel cell by destroying its catalytic activity. This sulfur-sensitivity is present in both low and high temperature fuel cells. Conventionally, the fuel is preprocessed by passing the fuel sequentially through a desulfurization unit, a steam reformer, and a shift reactor to produce a relatively pure fuel stock. The processed fuel contains trace levels of contaminants, such as sulfur, typically well below 1 part per million (ppm). A drawback of this preprocessing equipment is that it is relatively large and expensive, and thus adds to the overall cost of the power system.

The presence of sulfur in significant quantities in the fuel also promotes the corrosion of the fuel cell and other processing equipment, and is also a principal source of air pollution and acid rain when discharged into the air.

Hence, there still exists a need in the art for power generating systems that employ electrochemical converters without requiring expensive sulfur removing equipment. In particular, an electrochemical converter that is capable of processing sulfur containing hydrocarbon fuels would represent a major improvement in the art.

The invention will next be described in connection with certain preferred embodiments. However, it should be clear that various changes and modifications can be made by those skilled in the art without departing from the spirit and scope of the invention.

SUMMARY OF THE INVENTION

The present invention provides for a sulfur-tolerant electrochemical converter having low internal resistance that is capable of directly processing hydrocarbon fuel having a sulfur component of up to about 50 ppm, and in excess of this amount, without suffering permanent structural damage or suffering a significant and/or permanent decrease in overall operating performance. The electrochemical converter of the invention is a high temperature fuel cell that has an operating temperature between about 600° C. and about 1200° C. The fuel cell produces waste heat during operation that is at a temperature above the temperature necessary to vaporize liquid hydrocarbon fuel, if necessary. The high operating temperature of the fuel cell, in addition to the physical characteristics of the fuel cell discussed below, internally reforms the hydrocarbon fuel. These features reduce or eliminate the need for external fuel processing equipment to remove sulfur and to vaporize and to reform the fuel prior to introduction to the fuel cell.

The present invention attains the foregoing and other objects with an electrochemical converter that has an electrolyte layer with a fuel electrode material on one side and an oxidizer electrode material on the other side, and an interconnector having opposed contact surfaces. The interconnector is coupled to adjacent electrode surfaces and provides an electrical connection between the electrodes. The converter further includes structure to introduce a fuel reactant to the fuel electrode and an oxidizer reactant to the oxidizer electrode.

According to one aspect, one of the converter constituents, such as the interconnector, at least one of the contact surfaces of the interconnector, the fuel electrode, and the oxidizer electrode, is composed of a selected mixture containing at least chromium oxide and an alkaline metal oxide selected from the group consisting of beryllium oxide, magnesium oxide, calcium oxide, strontium oxide, barium oxide, and radium oxide.

According to a preferred aspect of the invention, the chromium oxide is $Cr_2O_3$, and the preferred mixture includes chromium oxide and magnesium oxide (MgO), and most preferably includes $Cr_2O_3$, MgO and aluminum oxide, such as $Al_2O_3$. The $Al_2O_3$ in the selected mixture is preferably less than about 50% mole. According to one practice, the fuel electrode material is composed of the chromium oxide/metal oxide containing mixture.

According to another aspect, one or both of the fuel electrode or the interconnector contact surface facing the fuel electrode is composed of a NiO composition.

According to still another aspect, one or both of the fuel electrode or the air electrode is composed of a $LaMnO_3$ composition.

According to other aspects of the invention, the operating temperature of the converter is between about 600° C. and about 1200° C., and is preferably between about 800° C. and about 1100° C. In another aspect, the converter internally vaporizes at least a portion of liquid fuel during operation, and can internally reform the hydrocarbon fuel into suitable reactant species, such as CO and $H_2$. The converter reforms the fuel by way of the converter waste heat. In a further aspect, the converter is a planar solid oxide fuel cell.

Other general and more specific objects of the invention will in part be obvious and will in part be evident from the drawings and description which follow.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale, show relative dimensions or relationships.

FIG. 2 is a side view of an electrolyte component and an interconnector component of the electrochemical converter of FIG. 1;

FIG. 3 is an isometric view of the electrolyte and interconnector components of FIG. 2;

FIG. 4 is a tabular comparison of selected parameters of the electrochemical converter of the invention with conventional fuel cells.

DESCRIPTION OF ILLUSTRATED EMBODIMENT

Figure 5:
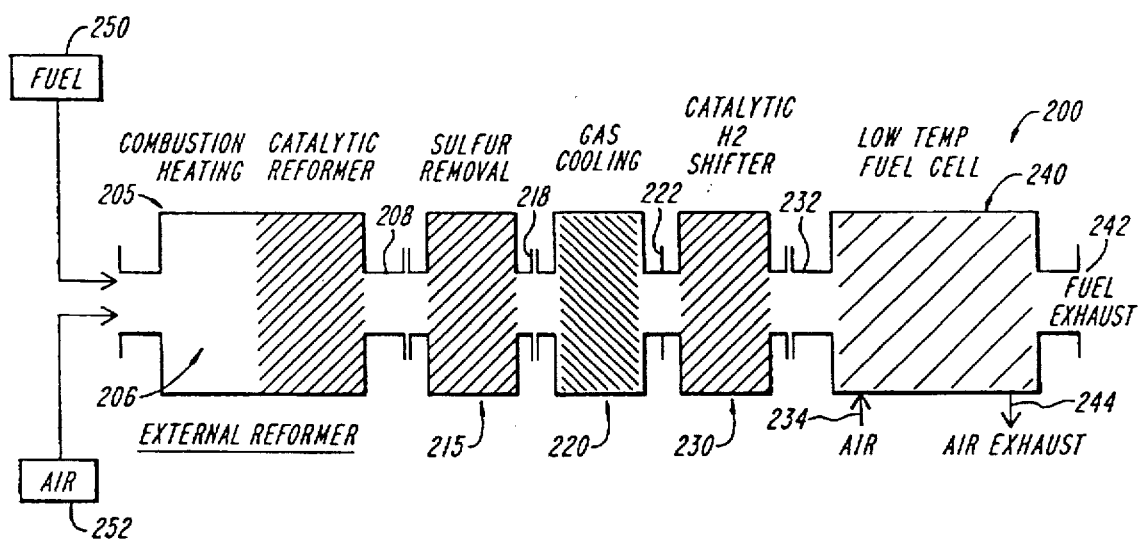
FIG. 5 is a schematic block diagram of a conventional fuel processing system typically used for processing the fuel stream of a low temperature fuel cell.

FIG. 5 is a schematic block diagram illustrating a classical fuel processing system 200 typically employed with conventional low temperature fuel cells. The processing system includes an external catalytic reformer 205, a desulfurization unit 215, a cooling stage 220, a carbon monoxide shift converter 230, and a low temperature fuel cell 240, all coupled in sequence as shown. A fuel source 250 and an air source 252 introduce a hydrocarbon fuel having hydrogen as the primary component and air, respectively, into the combustion chamber 206 portion of the reformer 205. In the chamber, air and fuel mix and are ignited to provide start-up energy for the reformer 205 and for the fuel cell 240. The fuel is heated within the chamber 206 until vaporized and is reduced catalytically into fuel species, such as hydrogen ($H_2$), carbon monoxide (CO), and hydrogen sulfide ($H_2S$).

The fuel species is discharged from the reformer chamber 206 and is introduced via a suitable fluid conduit 208 into the desulfurization unit 215, which converts a sulfur component of the fuel stream into hydrogen sulfide. The fuel is then passed through an adsorption desulfurizing agent such as zinc oxide (ZnO), which removes the hydrogen sulfide from the fuel mixture stream prior to its exiting the desulfurization unit 215. The fuel stream at the output end of the desulfurization unit 215 typically has a sulfur content of less than 0.1 ppm, which is characteristically the sulfur level a low temperature fuel can withstand without suffering permanent damage. The desulfurized fuel stream is then transferred to the cooling stage 220 along conduit 218, where the heated fuel stream is cooled to room temperature. The cooling stage 220 typically includes a heat exchanger of known construction.

The desulfurized and cooled fuel mixture exiting the cooling stage 220 passes through conduit 222 into the shift converter 230. The shift converter 230 is typically filled with a shift catalyst that converts the carbon monoxide present in the fuel stream into carbon dioxide. The shift converter also purifies the fuel to produce a fuel stock rich in pure hydrogen. The removal of carbon monoxide from the fuel stream is essential to prevent carbon monoxide poisoning of the fuel cell. This occurs when the carbon monoxide reacts with the platinum catalyst of the fuel electrode of the fuel cell to reduce or to destroy its catalytic activity. The fuel mixture exiting the shift converter 230 is thus typically rich in carbon dioxide and hydrogen.

The relatively clean fuel stream is introduced to the illustrated low temperature fuel cell 240 along conduit 232. The hydrogen present in the fuel stream then reacts with the air stream 234, which includes oxygen, according to an electrochemical process. The fuel cell produces electrical energy as well as water in the fuel exhaust as a by product of the electrochemical reaction. The fuel exhaust is discharged from the fuel cell 240 through conduit 242, while the air exhaust is discharged along conduit 244.

The foregoing prior art fuel cell power generation system 200 has a number of disadvantages. The desulfurization stage 215 requires frequent maintenance following the removal of sulfur from fuel containing relatively excessive amounts of sulfur or has difficulty removing relatively hard sulfur, e.g., thiopene. The sulfur in this stage is usually slipped off and thus avoids being adsorbed by the zinc oxide. The sulfur that escapes the desulfurization unit 215 then contaminates the downstream processing equipment (e.g., the shift converter), and eventually enters the low temperature fuel cell 240. Since the fuel cell 240 typically can only withstand sulfur levels below several ppm, the fuel cell is also contaminated and ultimately rendered inactive. The cost associated with purchasing and servicing the fuel processing equipment adds to the overall cost of the system.

Figure 1:
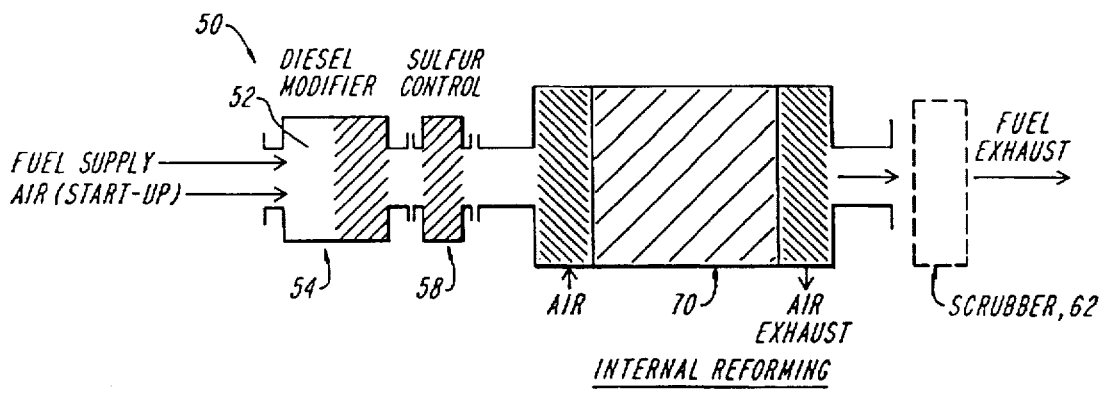
FIG. 1 is a schematic block illustration of the electrochemical converter and associated fuel processing system of the present invention.

FIG. 1 illustrates a fuel processing system 50 that can be employed with the fuel cell 70 of the present invention. The illustrated fuel cell is preferably sulfur-tolerant and is capable of internally reforming hydrocarbon fuel. The term "sulfur-tolerant" is intended to mean that the fuel cell can withstand sulfur levels in excess of several ppm and preferably up to about 50 ppm, and in excess of that amount, and probably significantly in excess of that amount, without permanently damaging the fuel cell and without excessively compromising the fuel cell efficiency. The appropriate level of fuel cell efficiency depends upon the specific installation set-up of the fuel cell, the type of fuel and oxidizer used, as well as the particular fuel cell mode employed during operation, and is readily determinable by one of ordinary skill in the art.

The illustrated fuel cell 70 preferably is a planar solid oxide fuel cell, although other fuel cell configurations, such as tubular, and other fuel cell types can be used, provided the fuel cell has an appropriate high operating temperature. The fuel cell of the present invention is preferably a high temperature fuel cell that is capable of operating at temperatures between about 600° C. and about 1200° C., preferably between about 800° C. and about 1100° C., and most preferably at about 1000° C. FIGS. 2 and 3 illustrate the basic fuel cell stack of the present invention. This fuel cell stack is shown comprising a single electrolyte plate 1, and a single interconnector plate 2. Known electrolyte plates 1 can be made of stabilized zirconia $ZrO_2(Y_2O_3)$ material 3, on which a porous oxidizer electrode 4 (cathode) and a porous fuel electrode 5 (anode) are provided. Common materials for the oxidizer electrodes are perovskites such as $LaMnO_3(Sr)$, and materials for the fuel electrodes are cermets such as $ZrO_2/Ni$. The interconnector plate 2 is typically made of a metal such as Inconel or a nickel alloy or made of a non-metallic conductor, such as silicon carbide. The particular materials which the interconnector, the electrolyte and the electrodes of the present invention are made are described in further detail below. The interconnector plate 2 serves as the electric connector between adjacent electrodes and as a partition between the fuel and oxidizer gases, as well as providing a heat conduction path along the electrode surfaces 4, 5 and to the external edges of the plates 1 and 2.

Fuel can be supplied to the cell stack through an axial, with respect to the stack, manifold 17 coupled to the stack via holes 13 and the fuel product is exhausted through manifold 18 via holes 14. The fuel is distributed over the fuel electrode surface 5 through passageway means illustrated as an in-plane groove network 6 formed in the upper surface of the interconnector plate 2. The notches 8 made in ridges 7 provide openings into the groove network 6 connecting holes 13 and 14 at the surface of each fuel electrode 5. The fuel can be a hydrocarbon fuel, examples of which include methane, propane, butane, Jet Propellant fuel (JP fuel), fuel oils, diesel oils and gasolines, and alcohol fuels including methyl and ethyl alcohols and mixtures thereof and ethers such as TAME, ETBE, DIPE, and MTBE, as well as fuels easily derived from them, such as hydrogen.

The oxidizer is fed to the stack from manifold 19 via holes 15 and its product is exhausted through manifold 11 via holes 16. The oxidizer is distributed over the oxidizer electrode surface of the next electrolyte plate through a complementary in-plane groove network 9, FIG. 2, formed in the lower surface of the conductor plate 2. A similar network on the lower surface of the adjacent cell above provides the passages for the oxidizer along electrolyte plate 1 as shown in FIG. 3. The outer ridges of the groove networks 6 and 9 on the interconnector plates 2 are brought in contact with electrolyte plates 1 to form the sealed outer walls of the stack assembly. The ridges 7 are pressed against the electrodes in the assembly to achieve electrical contacts. The stack can be secured by tension rods (not shown) or sealed. Although the present invention illustrates the peripheral portion of the fuel cell stack as being sealed, portions of the peripheral surface can also be open to allow the direct discharge of at least one of the reactant exhausts at this peripheral surface.

It is to be understood that the illustrated fuel cell can be operated in either a fuel cell mode or in an electrolysis mode. In a fuel cell mode, the fuel cell operates by electrochemically oxidizing a gaseous hydrocarbon fuel to produce electricity and heat. In an electrolysis mode, DC electrical power and steam or carbon dioxide or mixtures thereof are supplied to the cell which then decomposes the gas to produce hydrogen, carbon monoxide, or mixtures thereof (a fuel synthesizer).

A wide variety of conventional conductive materials can be used for the thin interconnector plates. The suitable materials for interconnector fabrication include nickel alloys, nickel-chromium alloys, nickel-chromium-iron alloys, iron-chromium-aluminum alloys, platinum alloys, cermets of such alloys and refractory material, such as zirconia or alumina, silicon carbide and molybdenum disilicide. The preferred materials of the fuel cell components of the present invention are discussed below.

The fuel electrode, e.g., anode, of the illustrated fuel cell 70 performs two main functions. First, the anode functions as an electron current collector (or distributor of electrons if the fuel cell is operated in the electrolysis mode). The electrode must collect the electrons liberated during the electrochemical oxidation of the fuel and provide a low resistance path for electron current flow to either a series connected fuel cell or an external power lead. Second, the anode provides a site for the electrochemical oxidation. This site is typically that location within the anode where the oxygen ions delivered by the electrolyte, gaseous fuel from the fuel stream and an electrical pathway to the electron current collector are simultaneously in contact.

Referring to FIG. 1, the processing system 50 can include a vaporizer 54, typically used with liquid hydrocarbon fuels, and an optional desulfurization unit 58. A gas scrubber 62 can also be employed at the output of the processing system 50. The vaporizer 54 includes an internal chamber 52 that receives a hydrocarbon liquid fuel. During start-up operation, the chamber further receives air and appropriate structure ignites the fuel and air to heat and to vaporize the fuel. Those of ordinary skill will recognize that the fuel cell 70 can also function as a vaporizer, depending upon the type of hydrocarbon fuel, and thus the vaporizer 54 can be an optional component of the system 50.

The heated fuel stream is introduced to an optional desulfurization unit 58, similar to the desulfurization unit 215 of FIG. 5. The desulfurization unit 58 is employed when the hydrocarbon fuel contains excessive amounts of the sulfur and select quantities need to be removed prior to introduction to the fuel cell 70 to comply with EPA requirements. For example, diesel fuel contains relatively high levels of sulfur and is thus partially desulfurized by the desulfurization unit 58 by lowering the sulfur content in the fuel stream to levels around 50 ppm. The fuel stream is then introduced into the fuel cell 70 where it is processed. The fuel cell then converts the fuel to electricity and fuel exhaust.

If the fuel exhaust is intended to be discharged directly into the environment, the sulfur concentrations in the exhaust must be examined to ensure compliance with EPA regulations. If this sulfur level is too high, additional sulfur must be removed. The illustrated gas scrubber 62 can thus be employed to clean the fuel exhaust by removing additional quantities of sulfur, to maintain the sulfur concentration within EPA prescribed limits.

The fuel cell 70 can further be integrated with appropriate heat transfer structure to effect regenerative heating of the incoming reactants, or regenerative cooling of the fuel cell stack. The heat transfer structure can include a plurality of interdigitated heat transfer elements as disclosed by the present inventor in U.S. Pat. No. 4,853,100, issued Aug. 1, 1989, which is herein incorporated by reference.

The fuel cell 70 of the invention is preferably tolerant to sulfur levels up to about 50 ppm, and in excess of that level, and significantly in excess of this level. The sulfur-tolerance of the fuel cell oftentimes eliminates the need for removing sulfur from the fuel prior to introduction into the fuel cell. Hence, the fuel can be directly fed into the fuel cell without permanently damaging, e.g., poisoning, the fuel cell or significantly reducing the overall efficiency of the fuel cell. One or more of the fuel cell constituents is preferably composed of a mixture that contains chromium oxide and an alkaline metal oxide, such as beryllium oxide, magnesium oxide, calcium oxide, strontium oxide, barium oxide, and radium oxide. According to one practice, the mixture is a lanthanum free mixture. According to a preferred embodiment, the chromium oxide is $Cr_2O_3$ and the alkaline metal oxide is magnesium oxide (MgO). According to a most preferred embodiment, one of the fuel cell constituents (e.g., the interconnector, one of the contact surfaces of the interconnector, the fuel electrode or the oxidizer electrode) is composed of a mixture containing chromium oxide, magnesium oxide, and aluminum oxide, such as $Al_2O_3$. The $Al_2O_3$ in the mixture is preferably less than about 50% mole. According to one practice, the chromium oxide/magnesium oxide mixture is a lanthanum-free mixture.

The materials that constitute the selected mixture used to make one or more of the fuel cell components can also contain the relatively pure form of the metals, such as chromium, aluminum, and an alkaline metal. In fact, during the manufacturing process, the relatively pure forms of the metals are used. These metals are later converted to their respective oxide forms during operation of the fuel cell by the electrochemical processes that occur therein.

The fuel cell components that can be made from the chromium oxide mixture include the fuel electrode, the oxidizer electrode, the interconnector plate, and the contact surfaces of the interconnector plate. Other materials which the fuel cell constituents of the invention can be made include $Al_2O_3$ for the interconnector or its contact surfaces, and can further be present in admixture with the chromium oxide and also in admixture with the chromium oxide and the alkaline metal oxide mixture, NiO for the fuel electrode material and the interconnector plate, and $LaMnO_3$ for the fuel and electrode materials.

The foregoing chromium oxide and alkaline metal oxide mixture, in conjunction with the structural dimensions of the planar solid oxide fuel cell, enable the fuel cell to withstand sulfur levels of up to about 50 ppm, and in excess of that amount. The chromium oxide and alkaline metal oxide mixture, and particularly the chromium oxide/magnesium oxide mixture, is stable in both oxidation and reduction environments, is highly conductive, and is highly tolerant to deleterious fuel cell contaminants, such as sulfur compounds, halogen compounds, molten salts, and other corrosive compounds present in commercial hydrocarbon fuels.

Conventional low temperature fuel cells can suffer permanent damage if exposed to fuel sulfur levels above several ppm. Additionally, the sulfur tolerance of these fuel cells is magnitudes lower than the level of sulfur present in state-of-the-art hot gas clean up systems used in coal gasification processes, and in other power generating systems. Some conventional high temperature fuel cells also require gas cleaning processing of the fuel reactant of the fuel cell Thus, conventional low and high temperature fuel cells require that the fuel be cleaned to remove the sulfur and other trace contaminants.

A major and unexpected result of the chromium oxide and the alkaline metal oxide mixture is the tolerance the fuel cell has to sulfur above several parts ppm during operation. Specifically, the fuel cell can operate under normal operating conditions in the presence of sulfur up to about 50 ppm, and in excess of that amount. This tolerance is understood to be a result of the geometrical design and electrical properties of the fuel cell, and the specific materials of the fuel cell constituents.

In addition to the sulfur-tolerant feature of the fuel cell 70 set forth above, another significant feature of fuel cell is that the chromium oxide/alkaline metal oxide mixture used to form one or more of the fuel cell components is highly conductive. This high electrical conductivity allows the fuel cell 70 to maintain a relatively high electrical and operational efficiency during the operational life of the fuel cell.

The fuel cell 70 has an operating temperature sufficiently high to cause the sulfur present in the hydrocarbon fuel to react with the nickel catalyst present in the fuel electrode (assuming this constituent does not contain the chromium oxide and alkaline metal oxide mixture) to form a nickel sulfide compound, designated as $NiS_x$ where x=1.33, 1.5 or 2. These sulfide compounds are electrically non-conductive and reduce the electrical conductivity of the anode and reduce the overall energy density of the fuel cell. Nevertheless, the high operating temperature of the fuel cell 70 and the relatively large electrical contact surface provided by the geometric design of the fuel cell components provide for a broad range of material selection that renders the fuel cell less susceptible to sulfur and to other trace contaminants. Consequently, the fuel cell 70 can overcome the reduced electrical conductivity created by the sulfur contaminant, and is capable of maintaining a sufficiently high operating efficiency. The preferred materials for the fuel cell constituents exhibit relatively high resistance to hot corrosion and maintain relatively high electrical conductivity when exposed to sulfur in a hydrogen atmosphere.

FIG. 4 shows the geometric comparison of a conventional molten carbonate fuel cell, a conventional tubular solid oxide fuel cell, and the fuel cell of the present invention. As illustrated, the fuel electrode electrical path length of the fuel cell 70 is significantly smaller than the path length of other conventional fuel cells. More specifically, the current generated during operation of the fuel cell 70 travels over a significantly shorter distance. As a result, the fuel electrode contribution to the overall fuel cell resistance is small. This small electrode resistance allows the fuel cell to operate in environments typically unsuitable for conventional fuel cells, while maintaining relatively high electrical and operational efficiency. Correspondingly, this results in a significantly lower geometric factor (defined as the electrode resistance multiplied by the current in the electrode) and a significantly lower voltage loss ratio, as compared with conventional fuel cells.

The high temperature fuel cell 70 of the invention can also perform a number of fuel processing tasks internally, such as fuel reforming, which eliminates the need for expensive external reforming equipment. The fuel cell of the present invention is readily adaptable for internal reforming of the fuel since the high operating temperature of the fuel cell and the catalytic nature of the fuel electrode material provide favorable conditions for most types of intermediate reforming to proceed readily within the fuel cell. Specifically, the high operating temperature satisfies the endothermic requirements of the reforming reaction, in situ of the fuel cell.

The electrochemical process that the fuel cell 70 performs during operation creates an internal supply of water in the fuel exhaust stream. Specifically, during the electrochemical reaction, oxygen ions transferred from the cathode surface to the anode surface and into the fuel stream. The manufacture of water within the fuel cell sharply reduces the need to supply externally water for reforming in the fuel cell. Additionally, the water vapor within the fuel exhaust can be recycled for use as a reforming agent, thus further reducing the need for an externally supplied reforming agent.

The high temperature fuel exhaust of the fuel cell can be recycled for use in a steam reforming process, e.g., in an external or internal fuel reforming process. For example, recycling of the high temperature exhaust can be accomplished by pressure ejector action of the fuel supply or rotary-type equipment, e.g., recirculating pumps.

Overall, a significant advantage of the electrochemical converter of the invention is that the structure of the converter and the materials of the converter components allow the fuel cell to process conventional hydrocarbon fuels containing sulfur without requiring substantial cleaning, if any, of the fuel prior to introduction to the converter. The fuel cell can further reform the hydrocarbon fuel internally, and can internally vaporize liquid hydrocarbon fuel. The fuel cell of the invention is capable of withstanding sulfur concentrations of at least about 50 ppm without suffering permanent damage. Hence, the converter of the invention reduces or eliminates the need for external fuel processing equipment such as a reformer and a shift reactor, and in some instances reduces or eliminates the need for a desulfurization unit and/or a fuel vaporizer.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. An electrochemical converter, comprising
an electrolyte layer having a fuel electrode material on one side and an oxidizer electrode material on the other side,
an interconnector having opposed contact surfaces for providing an electrical connection with adjacent electrodes, and
means for introducing a fuel reactant to the fuel electrode and an oxidizer reactant to the oxidizer electrode,
wherein at least one of the interconnector, one of the contact surfaces of the interconnector, the fuel electrode, and the oxidizer electrode comprises a selected mixture containing at least chromium oxide and a metal oxide selected from the group consisting of beryllium oxide, magnesium oxide, calcium oxide, strontium oxide, barium oxide, and radium oxide, and wherein said mixture is a lanthanum-free mixture.

2. The electrochemical converter of claim 1 wherein the electrochemical converter is a fuel cell.

3. The electrochemical converter of claim 1 wherein the chromium oxide is $Cr_2O_3$.

4. The electrochemical converter of claim 1 wherein the metal oxide of the selected mixture includes MgO.

5. The electrochemical converter of claim 1 wherein the selected mixture further includes $Al_2O_3$.

6. The electrochemical converter of claim 5 wherein the $Al_2O_3$ in the selected mixture is less than about 50% mole.

7. The electrochemical converter of claim 1 wherein at least one of the contact surfaces of the interconnector is composed of the selected mixture.

8. The electrochemical converter of claim 1 wherein the interconnector is composed of the selected mixture.

9. The electrochemical converter of claim 1 wherein the oxidizer electrode material contains the selected mixture.

10. The electrochemical converter of claim 1 wherein the fuel electrode material contains the selected mixture.

11. The electrochemical converter of claim 1 wherein at least one of the fuel electrode material and the portion of the interconnector facing said fuel electrode is composed of a NiO composition.

12. The electrochemical converter of claim 1 wherein the hydrocarbon fuel contains sulfur and the converter has an operating temperature of at least about 600° C., the converter producing electricity during operation according to an electrochemical reaction.

13. The electrochemical converter of claim 1 wherein the converter has an operating temperature between about 600° C. and about 1200° C.

14. The electrochemical converter of claim 1 wherein the converter has an operating temperature of at least about 600° C. and the hydrocarbon fuel is a liquid hydrocarbon fuel, the converter further including means for internally vaporizing at least a portion of the liquid fuel during operation thereof.

15. The electrochemical converter of claim 1 wherein the hydrocarbon fuel is a liquid hydrocarbon fuel, the converter further including means for externally vaporizing at least a portion of the liquid fuel during operation of the converter.

16. The electrochemical converter of claim 1 wherein the converter has an operating temperature of at least about 600° C., the converter further including internal reforming means for internally reforming the hydrocarbon fuel into reactant species.

17. The electrochemical converter of claim 16 wherein the reactant species includes CO and $H_2$.

18. The electrochemical converter of claim 1 wherein the converter has an operating temperature of at least about 600° C. and produces waste heat during operation thereof, the converter further including means for reforming the hydrocarbon fuel via the converter waste heat into reactant species.

19. The electrochemical converter of claim 18 wherein the reactant species includes CO and $H_2$.

20. The electrochemical converter of claim 1 wherein the converter has an operating temperature of at least about 600° C. and produces fuel exhaust during operation, the converter including means for reforming at least partially the hydrocarbon fuel via the converter exhaust into reactant species, including one of CO and $H_2$.

21. The electrochemical converter of claim 20 wherein the converter exhaust includes at least one of $CO_2$ and $H_2O$.

22. The electrochemical converter of claim 1 wherein the converter produces exhaust containing $CO_2$ during operation, and wherein said converter further includes means for collecting the $CO_2$ from the fuel exhaust.

23. The electrochemical converter of claim 1 wherein the oxidizer reactant includes oxygen which at least partially reforms the hydrocarbon fuel into reactant species, including CO and $H_2$, during start-up operation of the converter.

24. The electrochemical converter of claim 1 wherein the oxidizer reactant includes oxygen which at least partially reforms the hydrocarbon fuel into reactant species, including CO and $H_2$, during operation of the converter.

25. The electrochemical converter of claim 1 wherein the converter is a planar solid oxide fuel cell.

26. The electrochemical converter of claim 1 wherein the electrolyte includes a plurality of electrolyte plates having a fuel electrode material on one side and an oxidizer electrode material on the other side, and
the interconnector includes a plurality of interconnector plates, the interconnector plates providing an electrical contact with adjacent electrode surfaces, the interconnector plates and the electrolyte plates being alternately stacked together to form a converter assembly.

27. An electrochemical converter comprising
an electrolyte layer having a fuel electrode material on one side and an oxidizer electrode material on the other side, an interconnector having opposed contact surfaces for providing an electrical connection with adjacent electrodes, and means for introducing a fuel reactant to the fuel electrode and an oxidizer reactant to the oxidizer electrode, the oxidizer electrode material being composed of a chromium oxide containing mixture.

28. The electrochemical converter of claim 27 wherein the chromium oxide is $Cr_2O_3$.

29. The electrochemical converter of claim 27 wherein the chromium oxide containing mixture further includes MgO.

30. The electrochemical converter of claim 27 wherein the mixture further includes $Al_2O_3$.

31. The electrochemical converter of claim 30 wherein the $Al_2O_3$ in the selected mixture is less than about 50% mole.

32. The electrochemical converter of claim 27 wherein the chromium oxide containing mixture further includes an earth alkaline metal oxide.

33. The electrochemical converter of claim 32 wherein the chromium oxide containing mixture further includes $Al_2O_3$.

34. The electrochemical converter of claim 27 wherein the chromium oxide containing mixture is a lanthanum-free mixture.

35. The electrochemical converter of claim 27 wherein the converter is a planar solid oxide fuel cell.

36. An electrochemical converter, comprising an electrolyte layer having a fuel electrode material on one side and an oxidizer electrode material on the other side, an interconnector having opposed contact surfaces for providing an electrical connection with adjacent electrodes, and means for introducing a fuel reactant to the fuel electrode and an oxidizer reactant to the oxidizer electrode, wherein at least one of the fuel electrode material and the oxidizer electrode material is composed of a selected mixture containing chromium oxide and a metal oxide selected from the group consisting of beryllium oxide, magnesium oxide, calcium oxide, strontium oxide, barium oxide, and radium oxide.

37. The electrochemical converter of claim 36 wherein the electrochemical converter is a planar solid oxide fuel cell.

38. The electrochemical converter assembly of claim 36 wherein the chromium oxide is $Cr_2O_3$.

39. The electrochemical converter of claim 36 wherein the metal oxide of the selected mixture includes MgO.

40. The electrochemical converter of claim 36 wherein the selected mixture further includes $Al_2O_3$.

41. The electrochemical converter of claim 40 wherein the $Al_2O_3$ in the selected mixture is less than about 50% mole.

42. A solid oxide fuel cell system for converting a hydrocarbon fuel to electricity, comprising a plurality of solid electrolyte plates having a fuel electrode material on one side and an oxidizer electrode material on the other side, a plurality of interconnector plates having opposed contact surfaces, the interconnector plates providing an electrical contact with adjacent electrodes, the interconnector plates and the electrolyte plates being alternately stacked together to form a fuel cell assembly, means for introducing the hydrocarbon fuel reactant to the fuel electrode and an oxidizer reactant to the oxidizer electrode, and means for extracting electricity from the fuel cell system, wherein at least one of the fuel electrode and the oxidizer electrode is composed of a chromium oxide containing mixture.

43. The fuel cell system of claim 42 wherein the chromium oxide is $Cr_2O_3$.

44. The fuel cell system of claim 42 wherein the chromium oxide containing mixture further includes an alkaline metal oxide.

45. The fuel cell system of claim 42 wherein the chromium oxide containing mixture further includes MgO.

46. The fuel cell system of claim 42 wherein the selected mixture further includes $Al_2O_3$.

47. The fuel cell system of claim 46 wherein the $Al_2O_3$ in the selected mixture is less than about 50% mole.

48. An electrochemical converter, comprising an electrolyte layer having a fuel electrode material on one side and an oxidizer electrode material on the other side, an interconnector having opposed contact surfaces for providing an electrical connection with adjacent electrodes, and wherein at least one of the interconnector and the interconnector contact surfaces are composed of a selected mixture containing chromium oxide and a metal oxide selected from the group consisting of beryllium oxide, magnesium oxide, calcium oxide, strontium oxide, barium oxide, and radium oxide, wherein said mixture is a lanthanum-free mixture.

49. The electrochemical converter of claim 48 wherein the chromium oxide material is $Cr_2O_3$.

50. The electrochemical converter of claim 48 wherein the interconnector is composed of the selected mixture containing chromium oxide and MgO.

51. The electrochemical converter of claim 48 wherein the selected mixture further includes $Al_2O_3$.

52. The electrochemical converter of claim 51 wherein the $Al_2O_3$ in the selected mixture is less than about 50% mole.

53. The electrochemical converter of claim 48 wherein the contact surfaces of the interconnector are composed of the selected mixture, and wherein the metal oxide is MgO.

54. An electrochemical converter, comprising an electrolyte layer having a fuel electrode material on one side and an oxidizer electrode material on the other side, and an interconnector having opposed contact surfaces for providing an electrical connection with adjacent electrodes, wherein at least one of the interconnector, one of the contact surfaces of the interconnector, the fuel electrode, and the oxidizer electrode comprises a selected mixture containing at least chromium and a metal selected from the group consisting of beryllium, magnesium, calcium, strontium, barium, and radium, wherein said mixture is a lanthanum-free mixture.

55. The electrochemical converter of claim 54 wherein the electrochemical converter is a fuel cell.

56. The electrochemical converter of claim 54 wherein the selected mixture further includes aluminum.

57. The electrochemical converter of claim 56 wherein the aluminum in the selected mixture is less than about 50% mole.

* * * * *